United States Patent
Tabatabaei et al.

(10) Patent No.: US 9,601,931 B2
(45) Date of Patent: Mar. 21, 2017

(54) DEVICE AND METHOD FOR THE MONITORING AND BALANCING OF A MULTI-CELL ENERGY STORAGE STACK

(75) Inventors: Nejat Mahdavi Tabatabaei, Lindau (DE); Michael Kipp, Sigmarszell (DE); Aly Mashaly, Lindau (DE); Erich Riedisser, Sigmarszell (DE)

(73) Assignee: Liebherr-Elektronik GmbH, Lindau (DE)

( * ) Notice: Subject to any disclaimer, the term of this patent is extended or adjusted under 35 U.S.C. 154(b) by 1243 days.

(21) Appl. No.: 13/359,206

(22) Filed: Jan. 26, 2012

(65) Prior Publication Data

US 2012/0187774 A1    Jul. 26, 2012

(30) Foreign Application Priority Data

Jan. 26, 2011   (DE) .......................... 10 2011 009 474

(51) Int. Cl.
*H02J 7/00* (2006.01)
*H02J 7/34* (2006.01)

(52) U.S. Cl.
CPC ............. *H02J 7/0019* (2013.01); *H02J 7/345* (2013.01)

(58) Field of Classification Search
CPC ...... H02J 7/0014; H02J 7/0016; H02J 7/0019; H02J 7/0024; H02J 7/0034; H02J 7/0013
USPC ........ 320/116, 117, 166, 167, 118, 119, 122, 320/124
See application file for complete search history.

(56) References Cited

U.S. PATENT DOCUMENTS

| | | | |
|---|---|---|---|
| 6,404,165 B1* | 6/2002 | Shinpo | H02J 7/0029 320/104 |
| 7,772,803 B2* | 8/2010 | Jaeger | G01R 31/3658 320/116 |
| 7,825,638 B2* | 11/2010 | Bolz | G01R 31/3658 320/116 |
| 2002/0017895 A1 | 2/2002 | Kawashima | |
| 2004/0056639 A1* | 3/2004 | Saigo | H02J 7/0018 320/120 |
| 2005/0140336 A1* | 6/2005 | Anzawa | B60L 11/18 320/118 |
| 2007/0046260 A1* | 3/2007 | Ishikawa | H02J 7/0016 320/124 |
| 2008/0197806 A1* | 8/2008 | Ridder | H02J 7/0018 320/119 |
| 2010/0134068 A1* | 6/2010 | Lim | H02J 7/0016 320/116 |

FOREIGN PATENT DOCUMENTS

DE     202009007226 U1    2/2010

* cited by examiner

*Primary Examiner* — Richard Isla Rodas
*Assistant Examiner* — Michael Dibenedetto
(74) *Attorney, Agent, or Firm* — John D. Russell

(57) ABSTRACT

The present disclosure relates to a device for monitoring and balancing the cell voltages of at least two energy storage cells, which are electrically connected in series, of a multi-cell energy storage stack having at least one energy storage element, a voltage measuring unit, a first combinatorial circuit that is connected to each energy storage cell and the voltage measuring unit, a second combinatorial circuit that is connected to the energy storage element, the voltage measuring unit, and the first combinatorial circuit, and controls a control unit, which is connected to the voltage measuring unit and the first and second combinatorial circuit.

20 Claims, 4 Drawing Sheets

DEVICE AND METHOD FOR THE MONITORING AND BALANCING OF A MULTI-CELL ENERGY STORAGE STACK

CROSS REFERENCE TO RELATED APPLICATION

This application claims priority to German Patent Application No. 10 2011 009 474.1, entitled "Device and Method for the Monitoring and Balancing of a Multi-Cell Energy Storage Stack", filed Jan. 26, 2011, which is hereby incorporated by reference in its entirety for all purposes.

TECHNICAL FIELD

The present disclosure relates to a device and a method for monitoring and balancing the electrical energy storage cells of a multi-cell energy storage stack that is connected in series.

BACKGROUND AND SUMMARY

Electrical energy storage units are used for storing and preparing electrical energy in many application areas such as, for example, in motor vehicles, rail vehicles, cranes, or with decentralized power supply systems. The energy storage unit has at least one energy storage cell, which is often based on an electrochemical or purely electrical storage concept. A plurality of energy storage cells are connected in series in order to increase the electrical voltage provided by the storage cell or the available storage capacity.

For example, a plurality of double layer condensers connected in series form an energy storage stack in order to be able to furnish a higher output voltage, since the maximum available output voltage of an individual double layer condenser is generally limited to a small voltage range between 2.5 V and 2.7 V. If an application requires a nominal voltage of 100 V, 40 cells each having 2.5 V are collected into a single condenser stack.

Due to the high manufacturing tolerances, the storage cells have different capacitances and internal series resistances, as well as various self-discharging characteristics. This leads to non-uniform cell voltages within a condenser stack, which can give rise to an excess voltage in cells with low capacitance and to polarity reversal in cells with higher capacitance. The different cell voltages also give rise to an irregular change in the individual cells. A process for voltage equalization between the cells is thereby sought as a preventative measure.

The problem described previously occurs in principle in all energy storage stacks, independent of the storage concept used for the individual cells, i.e., electrochemical or purely electrical storage concepts.

Devices and methods for balancing the cell voltages are known from the prior art, which alongside trivial passive balancing procedures like parallel balancing resistors or Zener diodes, also suggest a charge transfer condenser that enables a transfer of charge between two cells having different cell voltages.

The object of the present disclosure is to continue the development of devices known from the prior art, in order to ensure a simplified and more effective monitoring and voltage balancing capability of the cell voltages.

This objective is achieved by a device for monitoring and balancing the cell voltages of at least two electrical energy storage cells of a multi-cell energy storage stack.

In one example, a voltage measuring unit is provided to monitor the cell voltage of the at least two electrical energy storage cells connected in series, which is connected directly in an electrically conducting manner through a first combinatorial circuit to each energy storage cell. An energy storage element is furthermore provided that acts as the energy transfer medium between at least two energy storage cells that are electrically connected in series. The energy storage medium can be directly connected electrically by a second combinatorial circuit through the first combinatorial circuit to each energy storage cell of the multi-cell energy storage stack. A control unit is furthermore provided that is connected to the voltage measuring unit and controls the first and second combinatorial circuits by taking into consideration the values transmitted by the voltage measuring unit.

In one embodiment, the voltage measuring unit can be selectively switched in parallel by the first combinatorial circuit to each individual energy storage cell of the energy storage stack for monitoring and/or measuring the voltage. A single voltage measuring unit is thereby sufficient to convert a voltage observation and/or measurement for each individual energy storage cell of the energy storage stack.

The energy storage element can be selectively switched in parallel to each energy storage cell by the first and second combinatorial circuit. The energy storage element may also operate as an energy transfer element, which transfers a portion of the electrical charge from an arbitrary cell to another arbitrary cell once or a plurality of times.

It has proven to be especially advantageous to use a charge transfer condenser as the energy storage element, and in particular a double layer condenser. If the charge transfer condenser is connected in parallel to an energy storage cell, an applied potential difference between the charge transfer condenser and energy storage cell then produces a charging or discharging process of the charge transfer condenser. A parallel connection of the charge transfer condenser with an energy storage cell at higher potentials causes a discharge of the cell in favor of the charge transfer condenser, until an equalization of the potential exists between the components that are connected in parallel. A parallel connection of the charge transfer condenser with an energy storage cell at lower potentials causes a discharge of the charge transfer condenser in favor of the storage cell, until an equalization of the potential exists between the components that are connected in parallel.

Both combinatorial circuits are advantageously independently controllable by the control unit. The topology of the first and second combinatorial circuits is developed so that it is possible to switch selectively in parallel from the charge transfer condenser to any cell.

The design of the individual switching elements of the first and/or second combinatorial circuits can be selected in a fundamentally arbitrary manner. Electromechanical relays are low loss devices and exhibit almost no voltage drop, but they have too small a lifetime. Bipolar transistors and IGBTs produce a disadvantageous high voltage drop in the circuit. The present disclosure makes use of semiconductor switches as the switching elements inside the first and/or second combinatorial circuit. The semiconductor switches used here produce only an extremely small voltage drop in the circuit, and are also low loss devices.

In an especially advantageous embodiment, MOSFET switches are used as semiconductor switches. Under certain circumstances the diode integrated in parallel in the MOSFET short circuits all the cells of the energy storage stack. For this reason a switching element of the first and/or second combinatorial circuit includes at least one antiserial protective circuit consisting of two MOSFET switches.

Unfavorable spurious common mode voltages can be evoked by the parallel connection of the voltage measuring unit having at least one arbitrarily selected energy storage cell, which lead to corruption of the measured results. The voltage measuring unit thus advantageously includes at least one precision capacitor and at least two switching elements for selectively decoupling the voltage measuring unit from the energy storage cell to be measured. the precision capacitor is connected to the input of the voltage measuring unit and is charged during the measurement phase through the first combinatorial circuit to the applied cell voltage of the energy storage cell to be measured, while the integrated measurement amplifier is decoupled by the at least two switching elements of the voltage measuring unit. As soon as the measurement amplifier holds the cell voltage, the connection to the measurement amplifier is terminated by element of the switching elements.

In a possible embodiment of the present disclosure at least one energy storage cell of the energy storage stack is an electrochemical accumulator or a condenser, in particular a double layer condenser. The individual energy storage cells can be the same or different. The energy storage element is advantageously chosen to be of the same type. The capacitance of the energy storage element advantageously corresponds approximately to the tolerance in the capacitance of the individual cells that are used. This enables an effective and rapid charge transfer between the energy storage cells.

It can be provided that the control unit has at least one data storage unit for storing one or more voltage measuring values detected by the voltage measuring unit. In order to evaluate the measured voltage value that is detected, it can be advantageous when one or a plurality of reference voltage values is stored in the data storage unit. It is also possible to store one or a plurality of voltage tolerance values that define a permissible deviation corridor for the measured voltage values.

In order to integrate or link the device according to the present disclosure to a subordinate or higher-ranking system, the control unit includes at least one data interface for data communications. The data interface serves to exchange the measured voltage values that are measured or more extensively analyzed values or data relevant for control purposes. The data interface serves in particular to link the device to an existing system data bus.

The present disclosure furthermore relates to a method for monitoring and balancing the cell voltages of at least two energy storage cells of a multi-cell energy storage stack that are electrically connected in series, wherein the method according to the present disclosure is implemented on a device according to one of the previously described variants of the device according to the present disclosure. The method may have the same advantageous properties as the device according to the present disclosure.

The method presented here relates to the control of the first and second combinatorial circuits by the control unit provided, in order to assure a selective measurement of the individual cell voltages and to carry out a voltage balancing operation between two or more energy cells as a function of the measurement value detected.

The control unit may control the first and second combinatorial circuit, in order to measure and/or monitor all cell voltages of the energy storage stack selectively or in a specified sequence by element of the voltage measuring device.

In particular, an evaluation of the measured voltage values is carried out to determine the voltage deviation of the first measured voltage value from one or more stored reference voltages. A deviation of the measured voltage values from one or more reference voltage values signals a critical operating condition of the energy storage stack.

An advantage of the method according to the present disclosure is that the control unit first of all identifies the energy storage cells of the energy storage stack with minimal and maximal cell voltages. The energy storage cells are balanced by using the energy storage element, up to the point where the voltage difference of both of the measured cell voltages falls below a predetermined reference value. This operational step is carried out recursively, up to the point where the maximum cell voltage difference occurring between two arbitrarily selected energy storage cells falls below a predetermined reference value.

An additional advantage of the method according to the present disclosure is that the control unit, with the aid of the measured voltage values, yield the charge energy state of each energy storage cell, and consequently the charge state of the entire energy storage stack.

It is also possible that the control unit with the aid of the measured voltage value provides an inference with respect to the relative state of aging, at least of a single energy storage cell.

The present disclosure furthermore relates to the use of such a device according to the present disclosure or the method according to the present disclosure in a machine having a multi-cell energy storage stack, such as e.g. in hybrid motor vehicles, rail vehicles, container cranes, and hybrid power shovels.

Additional advantages and details of the present disclosure will be explained with the aid of the embodiments shown in greater detail in the drawings.

DETAILED DESCRIPTION

Figure 1:
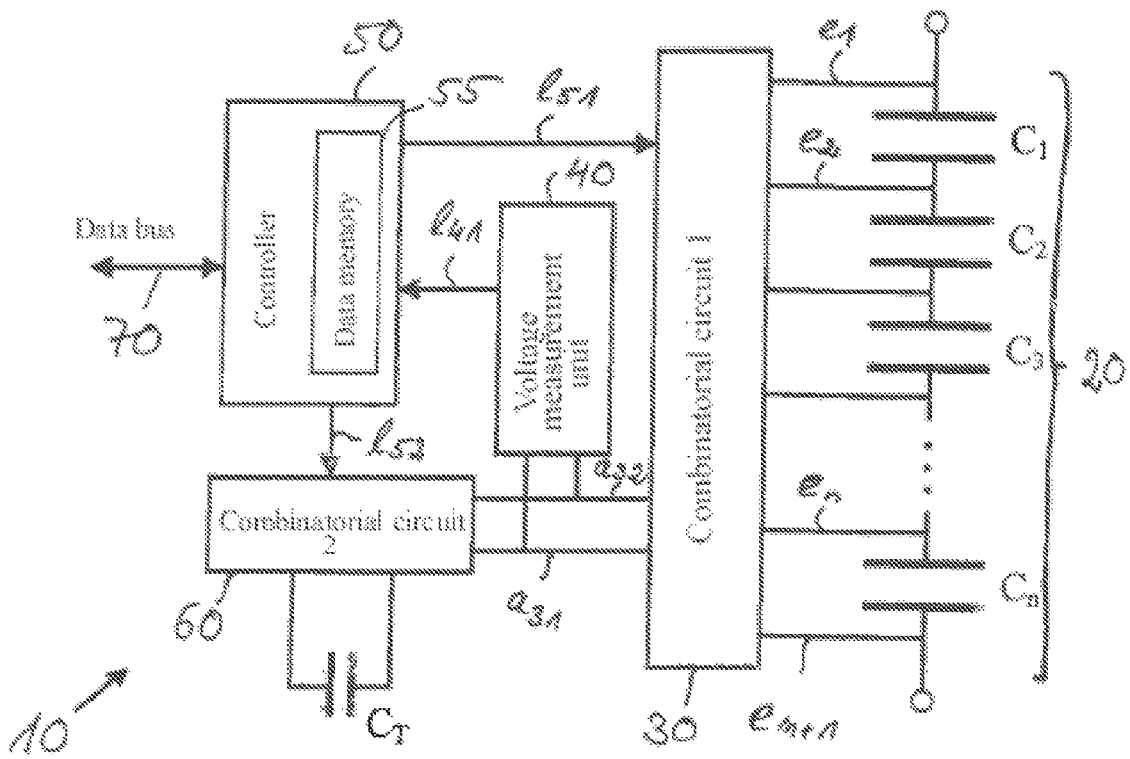
FIG. 1 shows a draft schematic diagram of the device according to the present disclosure.

The schematic diagram of FIG. 1 shows the device 10 according to the present disclosure for monitoring and balancing the cell voltages of at least two electrical energy storage cells of the of the multi-cell energy storage stack 20 that is connected in series. The energy storage stack 20 consists of n double layer condensers Cx that are connected in series for increasing the energy content and/or the output voltage of the energy storage stack 20. The combinatorial circuit 30 is connected through the connecting lines e1 . . . en+1 on the input side with each connecting electrode of the double layer condensers C1 . . . Cn. Both of the output lines a31, a32 are connected to the input of the voltage measuring unit 40, as well as to input of the combinatorial circuit 60.

The topology of the combinatorial circuit 30 is designed so that a parallel switching of the voltage measuring unit 40 and the combinatorial circuit 60 is selectively possible on each arbitrarily selected cell, which is to say on each arbitrarily selected double layer condenser C1 . . . Cn.

A charge transfer condenser CT is coupled to the combinatorial circuit 60. The combination of the combinatorial circuits 30, 60 is now designed so that a parallel switching of the charge transfer condenser CT to each arbitrarily selected cell C1 . . . Cn is selectively possible.

The control unit 50, which can control the two combinatorial circuits 30, 60 independently through the two signal lines 151, 152, is used to drive the device 10. The control unit may be include computer readable storage medium with non-transitory code therein. The code may include algorithms corresponding to the various actions of the methods described herein, including the method of FIG. 5.

In order to monitor the energy storage stack 20, a signal line 141 leads from the voltage measuring unit 40 to the control unit 50 to transfer the measured voltage values of the individual cells C1 . . . Cn as well as the charge transfer condenser CT. On the basis of the measured voltage values, the control unit 50 generates the corresponding control commands, which are transmitted through the control lines 151, 152 of the combinatorial circuits 30, 60.

For a time-delayed analysis and evaluation of the measured voltage values, the control unit 50 has the integrated data storage unit 55, in which, among other features, the measured voltage values obtained through the signal line 151 can be stored. In addition, defined reference voltage values and/or tolerance limits can be stored for the extensive analysis and evaluation of the measured voltage values.

In order to link to a co-ordinate or higher-ranking system, the control unit 50 includes a data interface with which the device 10 can be coupled to a data bus 70. The data interface serves, for example, to transfer the received measured voltage values and/or the analyzed data generated.

Figure 2:
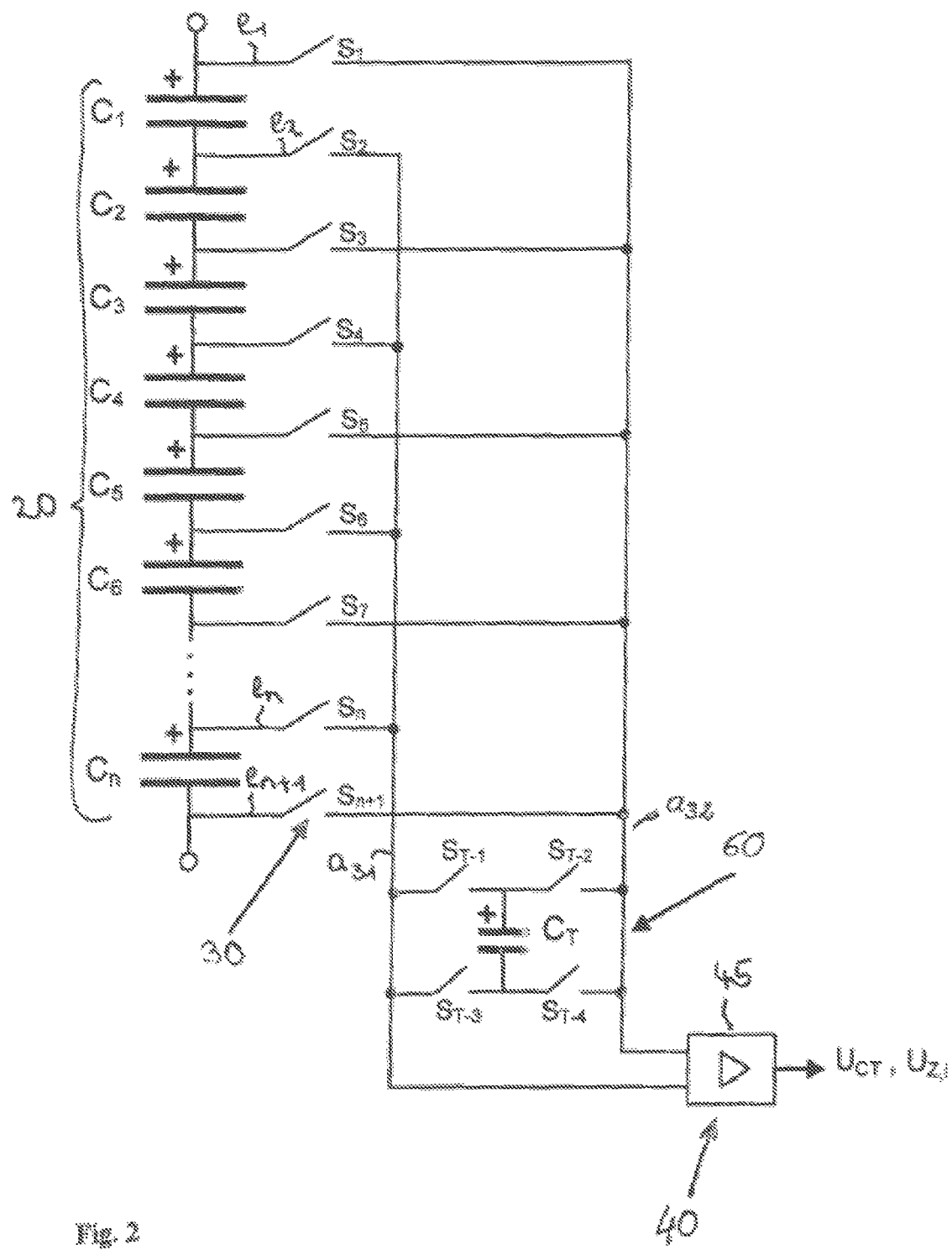
FIG. 2 shows a circuit diagram of the device according to the present disclosure.

FIG. 2 shows a detailed circuit diagram of the device 10 according to the present disclosure without the control unit 50. The combinatorial circuit 30 includes the switching elements S1 . . . Sn+1, which selectively connect through the input lines e1 . . . en+1 of the combinatorial circuit 30 to the two pole output lines a31, a32.

The output lines a31, a32 lead to the input of the measurement amplifier 45 of the voltage measuring unit 40. The combinatorial circuit 60 is also coupled to the output lines a31, a32. The combinatorial circuit 60 consists essentially of a group of four switching elements ST-1 . . . ST-4. An appropriate actuation of the four switching elements ST-1 . . . ST-4 in combination with the switching elements of the combinatorial circuit 30 causes a selective parallel switching of the charge transfer condenser CT to one of the double layer condensers C1 . . . Cn of the energy storage stack 20.

The chronological test of the individual cell voltages, i.e., the actuation of the switching elements S1-Sn+1, is carried out according to a prescribed procedure. In order to determine the cell voltage of the double layer condenser C1, the switching elements S1 and S2 are exclusively closed, in order to switch the measurement amplifier 45 in parallel to the double layer condenser C1. The cell voltage UZ,1 is applied to the output of the measurement amplifier. The cell voltage UZ,2 of the double layer condenser C2 is determined by actuation of the switching elements S2 and S3.

The voltage balancing between at least two double layer condensers of the energy storage stack 20 is carried out through the combined activation of the combinatorial circuits 30, 60. For a voltage balancing operation between the double layer condensers C1 and C6, both of the switching elements S1, S2 of the combinatorial circuit 30 are first actuated simultaneously, and then both of the switching elements ST-1, ST-4 of the combinatorial circuit 60 are actuated simultaneously, in order to switch the charge transfer condenser CT in parallel to C1. The charge transfer condenser CT is charged by the excess charge of the condenser C1 until the same voltage drop is present on both components. After opening the switching elements S1, S2, the charge transfer condenser is switched by actuation of the switching elements S6, S7, and the two switching elements ST-2, ST-3 are switched in parallel to the condenser C6 having the lower charge potential, which is charged by the relatively high potential of the charge transfer condenser CT until a potential balance is present between both components. The potential difference between the condensers C1, C6 is thus reduced.

It is also possible to determine the charge state of the charge transfer condenser CT. In this case all switching elements of the combinatorial circuit 30 remain open, and only the switching elements ST-1, ST-4 and/or ST-2, ST-3 are closed, in order to switch the charge transfer condenser in parallel to the measurement amplifier 45 of the voltage measuring unit 40. The amplified output voltage UCT of the charge transfer condenser CT is applied to the output of the voltage measuring unit 40.

Figure 3:
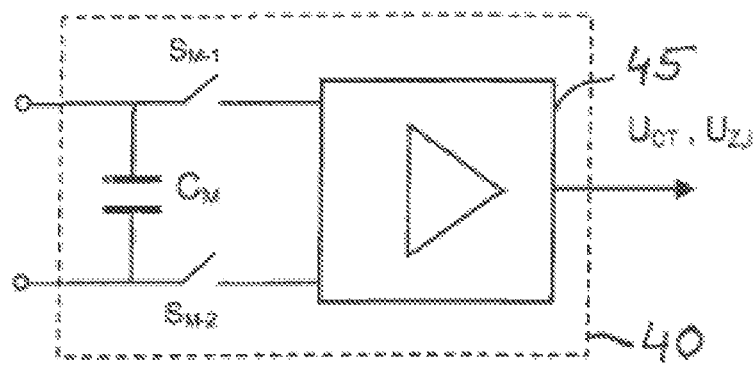
FIG. 3 shows a circuit diagram of one possible embodiment of the voltage measuring unit according to the present disclosure.

An advantageous embodiment of the voltage measuring unit 40 is shown in FIG. 3. In order to limit the influence of spurious common mode voltages on the measurement result, the measurement amplifier 45 is to be decoupled from the test assembly. A switched precision capacitor CM is connected at the input of the voltage measuring unit 40, which is switched during the measurement phase by the corresponding switching configuration of the combinatorial circuit 30 in parallel to an arbitrarily selected storage cell C1 . . . Cn. While the precision capacitor CM is charged to the applied cell voltage, the switches SM-1, SM-2 remain open in order to suppress the influence of the measurement amplifier 45. The precision capacitor CM is then decoupled from the respective storage cell Cx by actuation of the corresponding switching elements of the combinatorial circuit 30, and then coupled to the measurement amplifier 45 by actuation of the switches SM-1, SM-2 in order to detect the cell voltage stored in the precision capacitor CM.

Figure 4:
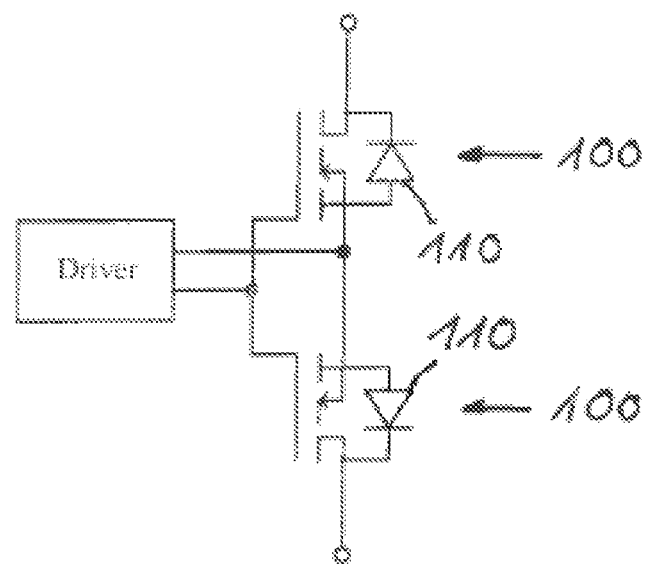
FIG. 4 shows a circuit diagram of a switching element of the first or second combinatorial circuit.

FIG. 4 shows a circuit diagram of the concrete implementation of a switching element of the combinatorial circuits 30, 60. Semiconductor switches are used in the design of the device according to the present disclosure, which produce a very small voltage drop in the circuit and are also low loss devices. Suitable semiconductor elements for these applications are MOSFET switches. In order to prevent the parallel connected integrated diode 110 from forming a short circuit, and consequently short circuiting all the storage cells C1-Cn of the energy storage stack 10, two MOSFET switches 100 are respectively arranged in an antiserial protective circuit to implement a switching element S1 . . . Sn+1, ST-1 . . . ST-4.

Figure 5:
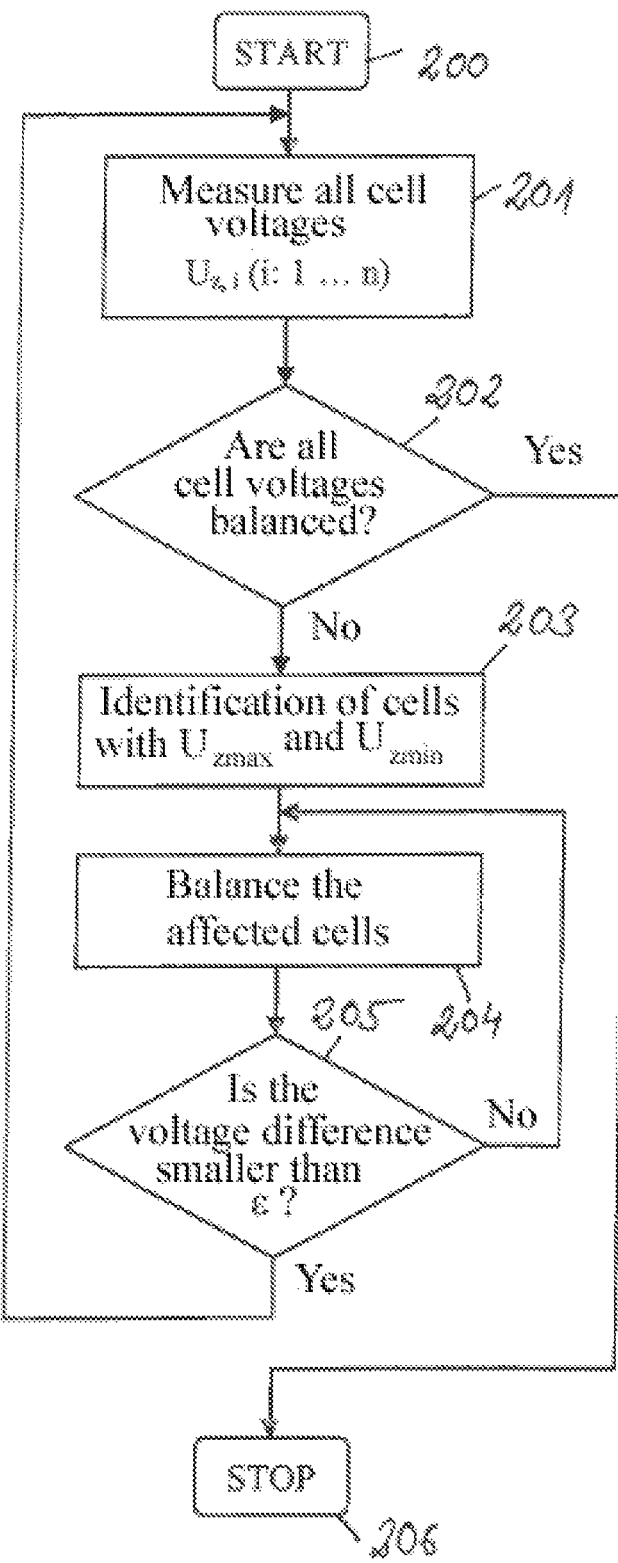
FIG. 5 shows a flow chart of the method according to the present disclosure for monitoring and balancing an energy storage stack.

FIG. 5 shows a flow chart that characterizes the method according to the present disclosure for monitoring and balancing balancing the voltages of an energy storage stack 10. Beginning at the initial state Start 200, all cell voltages UZ,i (i:1–n) of the double layer condensers are specified in state 201. The measurement of the individual cell voltages can be carried out either selectively or in a predefined sequence.

It is subsequently determined by the control unit 50 whether all cell voltages UZ,i are balanced. For this determination, for example, the difference voltage between two respective measured voltage values are determined by two energy storage cells C1 . . . Cn and their deviation is established by an allowable tolerance value. The possibility likewise exists that the individually measured cell voltages UZ,i can be compared to stored reference voltage values in order to trigger a balancing action when an impermissible deviation is detected.

If all cell voltages lie at an approximately constant level, the flow chart switches to the Stop state 206. In the event of an impermissible deviation in one or more cell voltages, the branching point 202 triggers a transition to the state 203 of the voltage balancing process.

In state 203 the corresponding double layer condensers C1 . . . Cn having the maximum and minimum cell voltages UZmax, UZmin are identified from the cell voltages UZ,i that are detected.

The cells that are detected are balanced in state 204 by a suitable activation of the combinatorial circuits 30, 60, in which the charge transfer condenser CT is alternately switched back and forth between the two cells. The cell voltages of the affected cells are newly obtained after each pass or after a specified number of balancing passes by the voltage measuring unit 40, and the calculated voltage difference is compared between the detected values and a tolerance value. In the branching point 205, the state diagram triggers another balancing process in state 204 if the potential difference obtained does not fulfill the stated requirements. If the measured voltage difference is smaller than a predefined tolerance value, a jump is made to the beginning of the flow chart, where all cell voltages UZ,i are tested once again.

The measured values or analyzed data obtained during the procedure can be stored for later processing in the data storage unit 55 of the control unit 50. It is likewise possible to route the corresponding data from the data storage unit 55 to a subordinate or higher-ranking system through the data interface.

The method according to the present disclosure does not only assure the orderly balancing of the individual cells C1 . . . Cn, but also allows conclusions to be drawn with regard to the charge state of each individual cell and/or the entire condenser stack 20 with the aid of the measured cell voltages. The control unit 50 can furthermore monitor relative state of aging of each individual cell C1 . . . Cn by using the measured value.

The embodiment described here was elaborated with the aid of an energy storage stack 20 having a plurality of double layer condensers C1 . . . Cn. An extension of the principle of energy storage stack designs according to the present disclosure with electrochemical accumulators, various forms of condensers, or other energy storage element is possible without relevant modification.

The charge transfer condenser CT is generally of the same type or structurally similar to that of the conventional type of energy storage cells. In a concrete embodiment, the charge transfer condenser CT is also a double layer condenser whose capacitance is almost identical to the capacitance tolerance of the storage cells C1 . . . Cn used. This enables an effective and rapid charge transfer between the cells C1 . . . Cn.

The invention claimed is:

1. A device for monitoring and balancing cell voltages of at least two electrical energy storage cells of a multi-cell energy storage stack comprising:

at least one capacitive energy storage element;

a voltage measuring unit;

a first combinatorial circuit having an input side selectively connected to each energy storage cell and first and second output lines connected to the voltage measuring unit;

a second combinatorial circuit comprising a first switching element selectively directly connecting the first output line with a positive electrode of the energy storage element, a second switching element selectively directly connecting the second output line with the positive electrode of the energy storage element, a third switching element selectively directly connecting the first output line of the first combinatorial circuit with a negative electrode of the energy storage element, and a fourth switching element selectively directly connecting the second output line of the first combinatorial circuit with the negative electrode of the energy storage element, the second combinatorial circuit connected to the voltage measuring unit via the first and second output lines; and a control unit, which is connected to the voltage measuring unit, and controls the first and second combinatorial circuits, the control unit comprising a computer readable storage medium with non-transitory code for transferring a portion of an electrical charge from a first arbitrary cell to a second arbitrary cell via the energy storage element once or a plurality of times by directly coupling the first arbitrary cell with the energy storage element and then directly coupling the second arbitrary cell with the energy storage element.

2. The device according to claim 1, wherein each energy storage cell can be switched selectively in parallel by the first combinatorial circuit with the voltage measuring unit for monitoring and/or measuring the voltage.

3. The device according to claim 2, wherein the energy storage element can be switched selectively in parallel with each energy storage cell by the first and second combinatorial circuits.

4. The device according to claim 1, wherein the at least one energy storage element includes at least one charge transfer condenser.

5. The device according to claim 4, wherein the charge transfer condenser is a double layer condenser.

6. The device according to claim 1, wherein the two combinatorial circuits can be controlled independently of one another by the control unit.

7. The device according to claim 1, wherein the switching element(s) of the first and/or second combinatorial circuits include at least two anti-serially connected MOSFET switches.

8. The device according to claim 1, wherein the voltage measuring unit includes at least one precision capacitor and a measurement amplifier, the at least one precision capacitor selectively couplable with the measurement amplifier via at least two switching elements arranged between the at least one precision capacitor and the measurement amplifier.

9. The device according to claim 1, wherein at least one of the least two electrical energy storage cells is an electrostatic accumulator or a condenser.

10. The device according to claim 1, wherein the control unit has at least one data storage unit for storing one or a plurality of measured voltage values and/or one or a plurality of reference voltage values and/or one or a plurality of voltage tolerance values, wherein the control unit includes at least one data interface for data communication, wherein the data communication is over a data bus, and with other devices of a co-ordinate and/or higher-ranking system.

11. The device according to claim 1, wherein the energy storage cells and the energy storage element are all double layer condensers.

12. The device according to claim 1, wherein the device has n energy storage cells and n+5 switching elements.

13. The device according to claim 7, wherein each MOSFET switch has an integrated diode.

14. The device according to claim 8, wherein the first and second output lines are directly connected to inputs of the measurement amplifier when the at least two switching elements arranged between the at least one precision capacitor and the measurement amplifier are closed.

15. The device according to claim 8, wherein the positive and negative electrodes of the energy storage element are both coupled to inputs of the measurement amplifier when the second and fourth switching elements are closed.

16. A method, comprising:
monitoring and balancing cell voltages of at least two electrical energy storage cells connected in series of a multi-cell energy storage stack with a device, the device having at least one capacitive energy storage element, a voltage measuring unit, a first combinatorial circuit having an input side selectively connected to each energy storage cell and first and second output lines connected to the voltage measuring unit, a second combinatorial circuit comprising a first switching element selectively directly connecting the first output line with a positive electrode of the energy storage element, a second switching element selectively directly connecting the second output line with the positive electrode of the energy storage element, a third switching element selectively directly connecting the first output line of the first combinatorial circuit with a negative electrode of the energy storage element, and a fourth switching element selectively directly connecting the second output line of the first combinatorial circuit with the negative electrode of the energy storage element, the second combinatorial circuit connected to the voltage measuring unit via the first and second output lines, and a control unit, which is connected to the voltage measuring unit, and controls the first and second combinatorial circuits, wherein the control unit determines the energy storage cells having minimal and maximal cell voltages, and balances the two energy storage cells once or a plurality of times until a voltage difference between the two cell voltages falls below a predetermined reference value, the balancing including directly coupling the energy storage cell having the maximal cell voltage with the energy storage element and then directly coupling the energy storage cell having the minimal cell voltage with the energy storage element.

17. The method according to claim 16, wherein the control unit detects all cell voltages selectively or in a specified sequence by the voltage measuring unit through activation of the combinatorial circuits, and accordingly controls two or more energy cells as a function of measured voltage values of the first and second combinatorial circuits for one or a plurality of voltage balancing operations.

18. The method according to claim 17, wherein the control unit recognizes and/or determines a voltage deviation of the measured voltage value(s) from one or a plurality of reference voltage values.

19. The method according to claim 17, wherein the control unit, using the measured voltage value(s), detects a charge state of each energy storage cell and consequently a charge state of the entire energy storage stack.

20. The method according to claim 19, wherein the control unit, using the measured voltage value(s), monitors a relative state of aging of each energy storage cell.

* * * * *